United States Patent
Park et al.

(10) Patent No.: US 11,438,248 B2
(45) Date of Patent: Sep. 6, 2022

(54) METHOD FOR DETECTING SIGNAL IN COMMUNICATION NETWORK BASED ON CONTROLLER AREA NETWORK, AND APPARATUS THEREFOR

(71) Applicants: Penta Security Systems Inc., Seoul (KR); Autocrypt Co., Ltd., Seoul (KR)

(72) Inventors: Seung Young Park, Chuncheon-si (KR); Sang Gyoo Sim, Seoul (KR); Duk Soo Kim, Seoul (KR); Seok Woo Lee, Seoul (KR); Myung Jin Kim, Seoul (KR); Eui Seok Kim, Seoul (KR)

(73) Assignees: Penta Security Systems Inc., Seoul (KR); Autocrypt Co., Ltd., Seoul (KR)

( * ) Notice: Subject to any disclaimer, the term of this patent is extended or adjusted under 35 U.S.C. 154(b) by 200 days.

(21) Appl. No.: 16/989,617

(22) Filed: Aug. 10, 2020

(65) Prior Publication Data

US 2021/0051085 A1     Feb. 18, 2021

(30) Foreign Application Priority Data

Aug. 14, 2019    (KR) .................. 10-2019-0099372

(51) Int. Cl.
    *H04L 43/08*      (2022.01)
    *G06N 3/08*      (2006.01)
    (Continued)

(52) U.S. Cl.
    CPC ............... *H04L 43/08* (2013.01); *G06N 3/08* (2013.01); *H04L 1/0061* (2013.01); *H04L 12/40* (2013.01);
    (Continued)

(58) Field of Classification Search
    CPC ........ G06N 3/0445; G06N 3/084; G06N 3/08; H04L 12/40; H04L 12/40169;
    (Continued)

(56) References Cited

U.S. PATENT DOCUMENTS 8,229,624 B2 * 7/2012 Breed ................. B60R 21/0132
                                                          701/36
9,008,854 B2 * 4/2015 Breed ..................... E05F 15/77
                                                          701/1

(Continued)

*Primary Examiner* — Oussama Roudani
(74) *Attorney, Agent, or Firm* — Goldilocks Zone IP Law

(57) ABSTRACT

An operation method of a communication node in a communication network may comprise receiving CAN signals from a plurality of CAN communication nodes; generating forward input data by performing forward preprocessing on the received CAN signals based on forward sampling times; generating forward mask data for the forward input data and forward time interval data according to the forward sampling times; generating backward input data by performing backward preprocessing on the CAN signals based on backward sampling times; generating backward mask data for the backward input data and backward time interval data according to the backward sampling times; and detecting an abnormal signal among the CAN signals by inputting the forward input data, forward mask data, forward time interval data, backward input data, backward mask data, and backward time interval data into a gated recurrent unit-decay (GRU-D) neural network.

2 Claims, 9 Drawing Sheets

(51) Int. Cl.
*H04L 1/00* (2006.01)
*H04L 12/40* (2006.01)

(52) U.S. Cl.
CPC ............... *H04L 2012/40215* (2013.01); *H04L 2012/40273* (2013.01)

(58) Field of Classification Search
CPC ................... H04L 1/0061; H04L 43/08; H04L 2012/40273; H04L 2012/40215
See application file for complete search history.

(56) References Cited

U.S. PATENT DOCUMENTS

| | | | |
|---|---|---|---|
| 2018/0113458 A1* | 4/2018 | Dong | G06N 3/08 |
| 2020/0216027 A1* | 7/2020 | Deng | H04L 63/1416 |
| 2020/0216080 A1* | 7/2020 | Soltanian | G06V 20/597 |

* cited by examiner

METHOD FOR DETECTING SIGNAL IN COMMUNICATION NETWORK BASED ON CONTROLLER AREA NETWORK, AND APPARATUS THEREFOR

CROSS-REFERENCE TO RELATED APPLICATIONS

This application claims priority to Korean Patent Application No. 10-2019-0099372 filed on Aug. 14, 2019 with the Korean Intellectual Property Office (KIPO), the entire contents of which are hereby incorporated by reference.

BACKGROUND

1. Technical Field

The present disclosure relates to a method and an apparatus for detecting a signal in a controller area network (CAN) based communication network, and more specifically, to a method and an apparatus for detecting an abnormal signal by using a gated recurrent unit-decay (GRU-D) neural network in a CAN-based vehicle network.

2. Related Art

Machine learning is a technique for artificial intelligence (AI) that refers to performing prediction tasks such as regression, classification, and clustering according to parameters trained by a computer based on data. In addition, deep learning is a field of the machine learning that teaches a person's way of thinking to computers, and it may be defined as a set of machine learning algorithms that attempt high-level abstractions (i.e., tasks for deriving core content or summarizing functions from a large amount of data or complex data) through a combination of various nonlinear transform techniques.

Such the deep learning architecture is a concept designed based on an artificial neural network (ANN). The artificial neural network is an algorithm that simulates virtual neurons after modeling them to have the same learning ability as a human brain, and is mainly used for pattern recognition. The ANN model used in the deep learning has a structure constructed by iterating linear fitting and nonlinear transformation or activation. The neural network models used in the deep learning may include a deep neural network (DNN), a convolutional neural network (CNN), a recurrent neural network (RNN), a restricted Boltzmann machine (RBM), a deep belief network (DBN), a deep Q-network, and the like.

Electronic devices installed in a vehicle have been increased significantly in their number and variety along with recent digitalization of vehicle parts. Generally, the electronic devices may be used throughout the vehicle, for example, a power train control system (e.g., an engine control system, an automatic transmission control system, or the like), a body control system (e.g., a body electronic equipment control system, a convenience apparatus control system, a lamp control system, or the like), a chassis control system (e.g., a steering apparatus control system, a brake control system, a suspension control system, or the like), a vehicle network (e.g., a controller area network (CAN), a FlexRay-based network, a media oriented system transport (MOST)-based network, or the like), a multimedia system (e.g., a navigation apparatus system, a telematics system, an infotainment system, or the like), and so forth.

The electronic devices used in each of these systems are connected via the vehicle network, which supports functions of the electronic devices. For instance, the CAN may support a transmission rate of up to 1 Mbps and support automatic retransmission of colliding messages, error detection based on a cycle redundancy interface (CRC), or the like.

Meanwhile, in the CAN-based vehicle network, interpolation may be used to preprocess a received signal of the vehicle network. However, if the received signal is preprocessed using interpolation, the performance of the vehicle network may deteriorate depending on a resolution according to the interpolation.

SUMMARY

Accordingly, exemplary embodiments of the present disclosure are directed to providing a method and an apparatus for detecting an abnormal signal by using a GRU-D neural network in a CAN-based communication network.

In order to achieve the objective of the present disclosure, an operation method of a communication node in a communication network may comprise receiving CAN signals from a plurality of CAN communication nodes; generating forward input data by performing forward preprocessing on the received CAN signals based on forward sampling times; generating forward mask data for the forward input data and forward time interval data according to the forward sampling times; generating backward input data by performing backward preprocessing on the CAN signals based on backward sampling times; generating backward mask data for the backward input data and backward time interval data according to the backward sampling times; and detecting an abnormal signal among the CAN signals by inputting the forward input data, forward mask data, forward time interval data, backward input data, backward mask data, and backward time interval data into a gated recurrent unit-decay (GRU-D) neural network.

The generating of the forward input data may comprise obtaining a forward reception window based on the forward sampling times; extending the forward reception window in a forward direction based on a time axis to a sampling time at which a received CAN signal exists; extending the forward reception window in a backward direction based on the time axis to a sampling time at which a received CAN signal exists; and generating the forward input data, which is a matrix indicating types of the CAN signals, based on the extended forward reception window.

The forward mask data may be a matrix having a value of 1 when there is data at a corresponding sampling time and having a value of 0 when there is no data at the corresponding sampling time.

The forward time interval data may be generated based on differences between the forward sampling times.

The generating of the backward input data may comprise obtaining a backward reception window based on the backward sampling times; extending the backward reception window in a backward direction based on a time axis to a sampling time at which a received CAN signal exists; extending the backward reception window in a forward direction based on the time axis to a sampling time at which a received CAN signal exists; and generating the backward input data, which is a matrix indicating types of the CAN signals, based on the extended backward reception window.

The backward time interval data may be generated based on differences between the backward sampling times.

The GRU-D neural network may include a GRU-D encoder including a plurality of GRU-D layers and a GRU-D decoder having a symmetrical structure with the GRU-D encoder.

The detecting of the abnormal signal may comprise outputting, by the GRU-D encoder, a second hidden matrix and encoder data based on the backward input data, the backward mask data, and the forward time interval data; outputting, by the GRU-D decoder, estimated data based on the second hidden matrix, the encoder data, the backward mask data, and the backward time interval data; and detecting the abnormal signal among the CAN signals by comparing the forward input data and the estimated data.

In order to achieve the objective of the present disclosure, a communication node in a communication network may comprise a processor and a memory storing at least one instruction executable by the processor, wherein when executed by the processor, the at least one instruction causes the processor to: receive CAN signals from a plurality of CAN communication nodes; generate forward input data by performing forward preprocessing on the received CAN signals based on forward sampling times; generate forward mask data for the forward input data and forward time interval data according to the forward sampling times; generate backward input data by performing backward preprocessing on the CAN signals based on backward sampling times; generate backward mask data for the backward input data and backward time interval data according to the backward sampling times; and detect an abnormal signal among the CAN signals by inputting the forward input data, forward mask data, forward time interval data, backward input data, backward mask data, and backward time interval data into a gated recurrent unit-decay (GRU-D) neural network.

In the generating of the forward input data, the at least one instruction may further cause the processor to: obtain a forward reception window based on the forward sampling times; extend the forward reception window in a forward direction based on a time axis to a sampling time at which a received CAN signal exists; extend the forward reception window in a backward direction based on the time axis to a sampling time at which a received CAN signal exists; and generate the forward input data, which is a matrix indicating types of the CAN signals, based on the extended forward reception window.

The forward mask data may be a matrix having a value of 1 when there is data at a corresponding sampling time and having a value of 0 when there is no data at the corresponding sampling time.

The forward time interval data may be generated based on differences between the forward sampling times.

In the generating of the backward input data, the at least one instruction may further cause the processor to: obtain a backward reception window based on the backward sampling times; extend the backward reception window in a backward direction based on a time axis to a sampling time at which a received CAN signal exists; extend the backward reception window in a forward direction based on the time axis to a sampling time at which a received CAN signal exists; and generate the backward input data, which is a matrix indicating types of the CAN signals, based on the extended backward reception window.

The GRU-D neural network may include a GRU-D encoder including a plurality of GRU-D layers and a GRU-D decoder having a symmetrical structure with the GRU-D encoder.

In the detecting of the abnormal signal, the at least one instruction may further cause the processor to: output, by the GRU-D encoder, a second hidden matrix and encoder data based on the backward input data, the backward mask data, and the forward time interval data; output, by the GRU-D decoder, estimated data based on the second hidden matrix, the encoder data, the backward mask data, and the backward time interval data; and detect the abnormal signal among the CAN signals by comparing the forward input data and the estimated data.

According to the exemplary embodiments of the present disclosure, by performing preprocessing on received signals without using interpolation in a CAN-based communication network, the performance of the communication network may not deteriorate even when a resolution of the received signals increases, and the preprocessing can be performed regardless of the characteristics of the received signals. Accordingly, the detection performance of the received signals can be improved. In addition, by detecting an abnormal signal using a GRU-D neural network in the CAN-based communication network, speed and accuracy of detecting the abnormal signal can be improved. Therefore, the performance of the communication network can be improved.

BRIEF DESCRIPTION OF DRAWINGS

Embodiments of the present disclosure will become more apparent by describing in detail embodiments of the present disclosure with reference to the accompanying drawings, in which.

DETAILED DESCRIPTION

Figure 1:
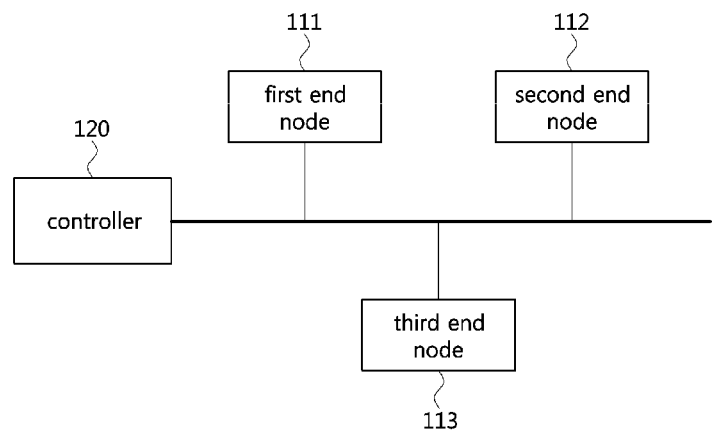
FIG. 1 is a block diagram illustrating a first exemplary embodiment of a network topology of a vehicle network.

Embodiments of the present disclosure are disclosed herein. However, specific structural and functional details disclosed herein are merely representative for purposes of describing embodiments of the present disclosure, however, embodiments of the present disclosure may be embodied in many alternate forms and should not be construed as limited to embodiments of the present disclosure set forth herein.

Accordingly, while the present disclosure is susceptible to various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present disclosure will be described in greater detail with reference to the accompanying drawings. In order to facilitate general understanding in describing the present disclosure, the same components in the drawings are denoted with the same reference signs, and repeated description thereof will be omitted.

FIG. 1 is a block diagram illustrating a first exemplary embodiment of a network topology of a vehicle network.

Referring to FIG. 1, a vehicle network may include a plurality of end nodes 111 to 113 and a controller 120. In addition, the communication nodes (i.e., the end nodes 111 to 113 and the controller 120) constituting the vehicle network may be connected in a star topology, a bus topology, a ring topology, a tree topology, a mesh topology, or the like. In addition, each of the communication nodes constituting the vehicle network may support a CAN protocol, a FlexRay protocol, a MOST protocol, a LIN protocol, an Ethernet protocol, or the like. The exemplary embodiments according to the present disclosure may be applied to the network topologies described above, and the network topology to which the exemplary embodiments according to the present disclosure are applied is not limited thereto and may be variously configured.

Meanwhile, the plurality of end nodes 111 to 113 and the controller 120 of FIG. 1 may be configured as follows.

Figure 2:
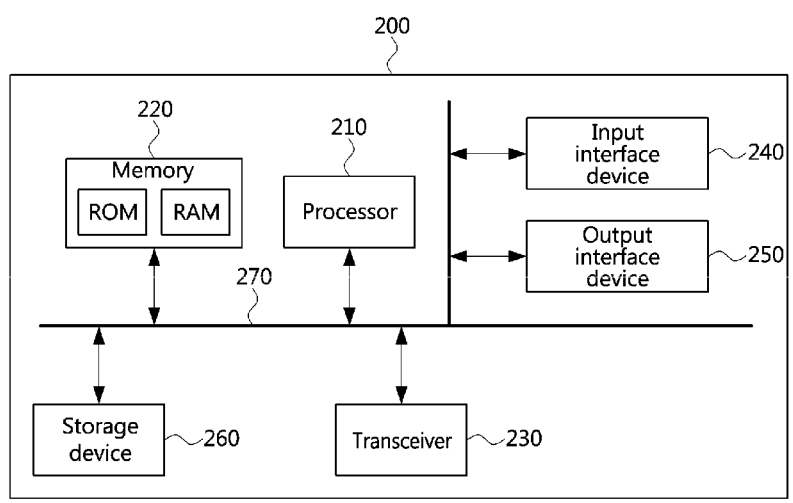
FIG. 2 is a block diagram illustrating an exemplary embodiment of a communication node constituting a vehicle network.

FIG. 2 is a block diagram illustrating an exemplary embodiment of a communication node constituting a vehicle network.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270.

However, each component included in the communication node 200 may be connected through a separate interface or a separate bus centered on the processor 210, not the common bus 270. For example, the processor 210 may be connected to at least one of the memory 220, the transceiver 230, the input interface device 240, the output interface device 250, and the storage device 260 through a dedicated interface.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the plurality of end nodes 111 to 113 in the vehicle network may be connected to each other through a bus line. That is, communications between the plurality of end nodes 111 to 113 may be performed through the bus line. Also, the plurality of end nodes 111 to 113 may communicate with the controller 120 through the bus line. Each of the plurality of end nodes 111 to 113 may transmit a signal to the controller 120 at each sampling time.

Each of the end nodes 111 to 113 may be an electronic control unit (ECU) that controls various devices included in the vehicle. For example, the end nodes 111 to 113 may be ECUs that constitute infotainment devices (e.g., a display device, a navigation device, an around view monitoring device) or the like.

The controller 120 may receive signals from the plurality of end nodes 111 to 113 through the bus line. The controller 120 may receive the signals transmitted by the plurality of end nodes 111 to 113 at the respective sampling times. The controller 120 may detect an abnormal signal among the signals received from the plurality of end nodes 111 to 113.

Figure 3:
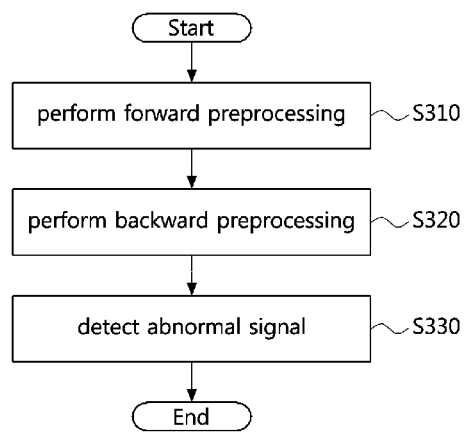
FIG. 3 is a flowchart illustrating a first exemplary embodiment of a method for detecting an abnormal signal in a vehicle network.

FIG. 3 is a flowchart illustrating a first exemplary embodiment of a method for detecting an abnormal signal in a vehicle network.

The end nodes and controller of FIG. 3 may be configured identically or similarly to the end nodes 111 to 113 and controller 120 of FIG. 1. Referring to FIG. 3, the controller (e.g., the controller 120 of FIG. 1) may perform forward preprocessing based on the signals received from the end nodes (e.g., the end nodes 111 to 113 of FIG. 1) (S310).

Figure 4:
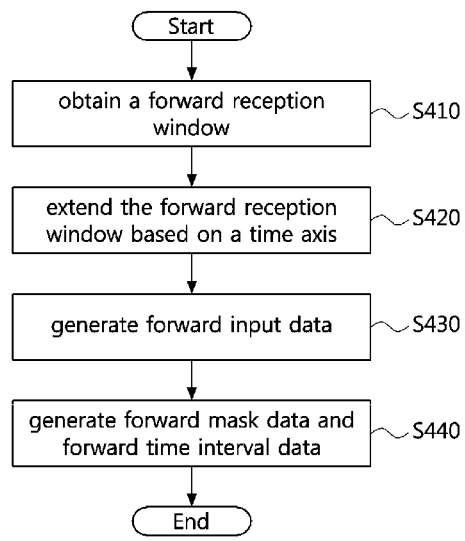
FIG. 4 is a flowchart illustrating a first exemplary embodiment of a method for performing forward preprocessing in a vehicle network.

FIG. 4 is a flowchart illustrating a first exemplary embodiment of a method for performing forward preprocessing in a vehicle network.

The end nodes and controller of FIG. 4 may be configured identically or similarly to the end nodes 111 to 113 and controller 120 of FIG. 1. Referring to FIG. 4, the controller (e.g., the controller 120 of FIG. 1) may obtain a forward reception window based on the signals received from the end nodes (e.g., the end nodes 111 to 113 of FIG. 1) and the sampling times of the signals (S410).

The controller may perform sampling at a preset periodicity. That is, the controller may detect sampling times at which the signals are received from the end nodes among the times at which the controller performs the sampling.

The controller may sort the received signals based on CAN IDs of the end nodes and the sampling times at which the signals are received from the end nodes. The controller may generate a forward graph in which the CAN IDs of the end node are located in a vertical axis and the sampling times at which the signals are received from the end nodes are located in a horizontal axis. In the forward graph, the signals received from the end nodes may be sorted in a temporal order. The controller may obtain a forward reception window by obtaining a graph of a predetermined section from the generated graph.

Figure 5:
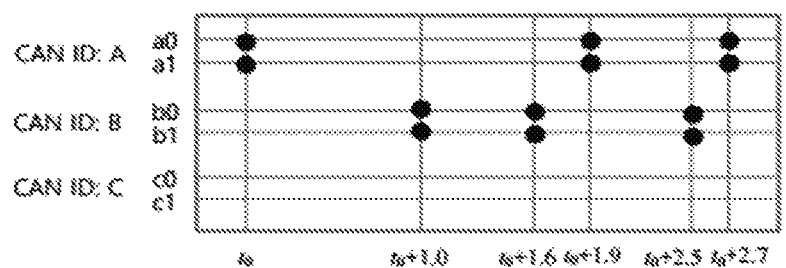
FIG. 5 is a conceptual diagram illustrating a first exemplary embodiment of a method of obtaining a forward reception window in a vehicle network.

FIG. 5 is a conceptual diagram illustrating a first exemplary embodiment of a method of obtaining a forward reception window in a vehicle network.

The end nodes and controller of FIG. 5 may be configured identically or similarly to the end nodes 111 to 113 and controller 120 of FIG. 1. In FIG. 5, a CAN ID A may be a CAN ID of the first end node 111 of FIG. 1, a CAN ID B may be a CAN ID of the second end node 112, and a CAN ID C is a CAN ID of the third end node 113.

Referring to FIG. 5, the controller may receive the signals from the end nodes at one or more sampling times. The controller may receive signals from the first end node at the times $t_0$ [sec], $t_0+1.9$ [sec], and $t_0+2.7$ [sec]. The controller may receive signals from the second end node at the times $t_0+1.0$ [sec], $t_0+1.6$ [sec], and $t_0+2.5$ [sec].

The controller may generate the forward graph having the sampling times (i.e., $t_0$ [sec], $t_0+1.0$ [sec], $t_0+1.6$ [sec], $t_0+1.9$ [sec], $t_0+2.5$ [sec], and, $t_0+2.7$ [sec]) in the horizontal axis and the CAN IDs (i.e., CAN ID A, CAN ID B, and CAN ID C) of the end nodes in the vertical axis. In the forward graph, the signals received from the end nodes by the controller may be arranged in the order of reception times. The controller may obtain a forward graph of a section from $t_0$ [sec] to $t_0+2.7$ [sec], which is a part of the generated forward graph, as the forward reception window.

Referring again to FIG. 4, the controller may extend the forward reception window based on the time axis (S420).

The controller may extend the forward reception window by extending the horizontal axis of the forward reception window to both sides. That is, the controller may extend the forward reception window to both sides in order to detect the times at which the signals are received from all the end nodes (e.g., the end nodes 111 to 113 of FIG. 1).

Figure 6:
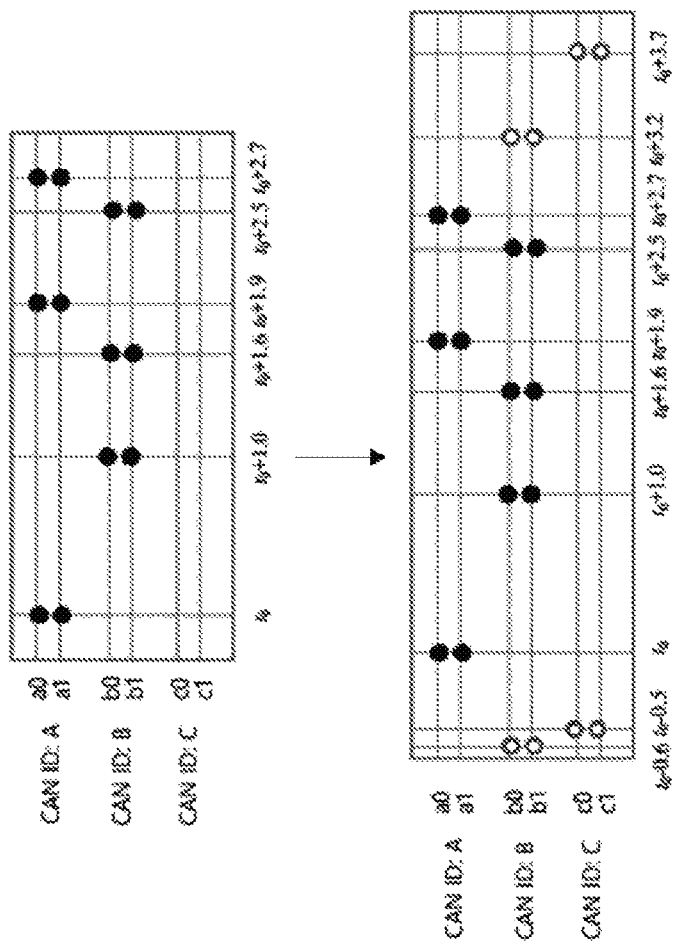
FIG. 6 is a conceptual diagram illustrating a first exemplary embodiment of a method of extending a forward reception window in a vehicle network.

FIG. 6 is a conceptual diagram illustrating a first exemplary embodiment of a method of extending a forward reception window in a vehicle network.

The end nodes and controller of FIG. 6 may be configured identically or similarly to the end nodes 111 to 113 and controller 120 of FIG. 1. In addition, the forward reception window of FIG. 6 may be the same as the forward reception window of FIG. 5.

Referring to FIG. 6, the controller may obtain sampling times at which signals are received from the second end node and the third end node before $t_0$ [sec] which is a starting time of the reception window. The controller may obtain sampling times at which signals are received from the second end node and the third end node after $t_0+2.7$ [sec] which is an ending time of the reception window.

The controller may extend the horizontal axis of the forward reception window obtained in the step S410 to both sides. That is, the controller may extend the forward reception window obtained in the step S410 from $t_0$ [sec] to the left side (i.e., the direction in which time decreases) and extend the forward reception window from $t_0+2.7$ [sec] to the right side (i.e., the direction in which time increases).

The controller may extend the forward reception window to the left up to the time at which the signals are received from the remaining end nodes (e.g., $t_0-0.6$ [sec] at which the signal is received from the second end node). The controller may extend the forward reception window to the right up to the time at which the signals are received from the remaining end nodes (e.g., $t_0+3.7$ [sec] at which the signal is received from the third end node).

Referring again to FIG. 4, the controller may generate forward input data based on the forward reception window (see FIG. 6) extended in the step S420 (S430). The controller may generate the forward input data by representing the forward reception window extended in the step S420 as one matrix as shown in Equation 1 below.

[Equation 1]

$$X_{ext} = [x_{-2} \ x_{-1} \ x_0 \ \ldots \ x_7] =$$

$$\begin{bmatrix} n/a & n/a & x_{0,0} & n/a & n/a & x_{0,3} & n/a & x_{0,5} & n/a & n/a \\ n/a & n/a & x_{1,0} & n/a & n/a & x_{1,3} & n/a & x_{1,5} & n/a & n/a \\ x_{2,-2} & n/a & n/a & x_{2,1} & x_{2,2} & n/a & x_{2,4} & n/a & x_{2,6} & n/a \\ x_{3,-2} & n/a & n/a & x_{3,1} & x_{3,2} & n/a & x_{3,4} & n/a & x_{3,6} & n/a \\ n/a & x_{4,-1} & n/a & n/a & n/a & n/a & n/a & n/a & n/a & x_{4,7} \\ n/a & x_{5,-1} & n/a & n/a & n/a & n/a & n/a & n/a & n/a & x_{5,7} \end{bmatrix}$$

In Equation 1, $x_{0,0}$, $x_{0,3}$, $x_{0,5}$, $x_{1,0}$, $x_{1,3}$, and $x_{1,5}$ may denote the signals received from the first end node at $t_0$ [sec], $t_0+1.9$ [sec], and $t_0+2.7$ [sec]. $x_{2,-2}$, $x_{2,1}$, $x_{2,2}$, $x_{2,4}$, $x_{2,6}$, $x_{3,-2}$, $x_{3,1}$, $x_{3,2}$, $x_{3,4}$, and $x_{3,6}$ may denote the signals received from the second end node at $t_0-0.6$ [sec], $t_0+1.0$ [sec], $t_0+1.6$ [sec], $t_0+2.5$ [sec], and $t_0+3.2$ [sec]. $x_{4,-1}$, $x_{4,7}$, $x_{5,-1}$, and $x_{5,7}$ may denote the signals received from the third end node at $t_0-0.5$ [sec] and $t_0+3.7$ [sec].

The controller may generate forward mask data and forward time intervals based on the forward input data generated in the step S430 (S440).

The mask data may be a matrix indicating whether a specific end node has received a signal at a specific sampling time. The controller may generate forward mask data, which is a matrix having a value of 1 when a signal is received at a corresponding sampling time and having a value of 0 when a signal is not received at the corresponding sampling time. Here, the sampling times may be times at which a signal is received from at least one of the end nodes 111 to 113. For example, the controller may generate mask data such as Equation 2 below based on the forward input data generated according to Equation 1.

$$M_{ext} = [m_{-2}\ m_{-1}\ m_0\ \ldots\ m_7] \quad \text{[Equation 2]}$$

$$= \begin{bmatrix} 0 & 0 & 1 & 0 & 0 & 1 & 0 & 1 & 0 & 0 \\ 0 & 0 & 1 & 0 & 0 & 1 & 0 & 1 & 0 & 0 \\ 1 & 0 & 0 & 1 & 1 & 0 & 1 & 0 & 1 & 0 \\ 1 & 0 & 0 & 1 & 1 & 0 & 1 & 0 & 1 & 0 \\ 0 & 1 & 0 & 0 & 0 & 0 & 0 & 0 & 0 & 1 \\ 0 & 1 & 0 & 0 & 0 & 0 & 0 & 0 & 0 & 1 \end{bmatrix}$$

The controller may generate a forward sampling matrix indicating differences between sampling times when signals are received from end nodes. The forward sampling matrix may be a matrix indicating time differences between the earliest signal reception time and the remaining signal reception times in the extended forward reception window. For example, a forward sampling matrix such as Equation 3 below may be generated based on the extended forward reception window of FIG. 5.

$$s_{ext} = [s_{-2}\ s_{-1}\ s_0\ \ldots\ s_7] \quad \text{[Equation 3]}$$
$$= [0\ 0.1\ 0.6\ 1.6\ 2.2\ 2.5\ 3.1\ 3.3\ 3.8\ 4.3]$$

In Equation 3, each component of the forward sampling matrix may represent a difference between the earliest sampling time $t_0$–0.6 [sec] and each of the remaining signal reception times among the times at which the signals are received from the end nodes. The controller may generate forward time interval data based on the forward sampling matrix and the forward mask data. The controller may generate the forward time interval data in a matrix form based on Equation 4 below.

$$\delta_{k,t} = \begin{cases} s_t - s_{t-1} + \delta_{k,t-1}, & \text{for } t > \min(t),\ m_{k,t} = 0 \\ s_t - s_{t-1}, & \text{for } t > \min(t),\ m_{k,t} = 1 \\ 0, & t = \min(t) \end{cases} \quad \text{[Equation 4]}$$

In Equation 4, $\delta_{k,t}$ may be a component of k-th row and t-th column of the forward time interval data. $S_t$ may be a t-th component of the forward sampling matrix, $\delta_{k,t-1}$ may be a component of k-th row and (t−1)-th column of the forward time interval data, min (t) may be the earliest time among the sampling times of the extended forward reception window, and $m_{k,z}$ may be a component of k-th row and t-th column of the forward mask data.

For example, the forward time interval data may be generated as shown in Equation 5 below based on the forward mask data generated by Equation 2 and the forward sampling matrix generated by Equation 3.

$$\Delta_{ext} = [\delta_{-2}\ \delta_{-1}\ \delta_0\ \ldots\ \delta_7] \quad \text{[Equation 5]}$$

$$= \begin{bmatrix} 0 & 0.1 & 0.6 & 1.0 & 1.6 & 1.9 & 0.6 & 0.8 & 0.5 & 1.0 \\ 0 & 0.1 & 0.6 & 1.0 & 1.6 & 1.9 & 0.6 & 0.8 & 0.5 & 1.0 \\ 0 & 0.1 & 0.6 & 1.6 & 0.6 & 0.3 & 0.9 & 0.2 & 0.7 & 0.5 \\ 0 & 0.1 & 0.6 & 1.6 & 0.6 & 0.3 & 0.9 & 0.2 & 0.7 & 0.5 \\ 0 & 0.1 & 0.5 & 1.5 & 2.1 & 2.4 & 3.0 & 3.2 & 3.7 & 4.2 \\ 0 & 0.1 & 0.5 & 1.5 & 2.1 & 2.4 & 3.0 & 3.2 & 3.7 & 4.2 \end{bmatrix}$$

Referring again to FIG. 3, the controller may perform backward preprocessing based on the signals received from the end nodes (S320).

Figure 7:
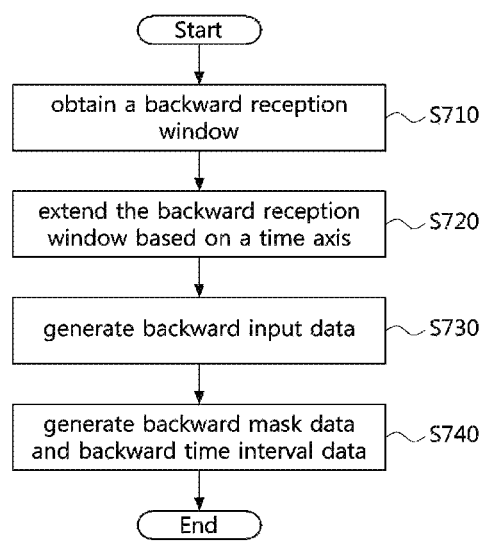
FIG. 7 is a flowchart illustrating a first exemplary embodiment of a method of performing backward preprocessing in a vehicle network.

FIG. 7 is a flowchart illustrating a first exemplary embodiment of a method of performing backward preprocessing in a vehicle network.

The end nodes and controller of FIG. 7 may be configured identically or similarly to the end nodes 111 to 113 and controller 120 of FIG. 1. Referring to FIG. 7, the controller (e.g., controller 120 of FIG. 1) may obtain a backward reception window based on the signals received from the end nodes (e.g., the end nodes 111 to 113 of FIG. 1) and sampling times of the signals (S710).

The controller may perform sampling at a preset periodicity. That is, the controller may detect sampling times at which the signals are received from the end nodes among the times at which the controller performs the sampling. The controller may sort the received signals based on CAN IDs of the end nodes and the reception times of the signals in a reverse order of the reception times of the signals.

The controller may generate a backward graph in which the CAN IDs of the end nodes are in a vertical axis and the times at which signals are received from the end nodes among the backward sampling times are in a horizontal axis. Here, the backward sampling times may be sampling times obtained by multiplying the sampling times of each controller by a value of −1.

The controller may generate a backward graph in which the CAN IDs of the end node are located in the vertical axis and the reception times at which the signals are received from the end nodes among backward sampling times are located in the horizontal axis. Here, the backward sampling times may be sampling times obtained by multiplying the respective sampling times of the controller by a value of −1.

Figure 8:
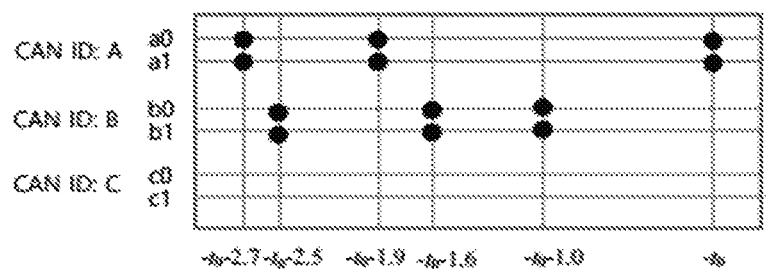
FIG. 8 is a conceptual diagram illustrating a first exemplary embodiment of a method of obtaining a backward reception window in a vehicle network.

FIG. 8 is a conceptual diagram illustrating a first exemplary embodiment of a method of obtaining a backward reception window in a vehicle network.

The end nodes and controller of FIG. 8 may be configured identically or similarly to the end nodes 111 to 113 and controller 120 of FIG. 1. In FIG. 8, a CAN ID A may be a CAN ID of the first end node 111 of FIG. 1, a CAN ID B may be a CAN ID of the second end node 112, and a CAN ID C is a CAN ID of the third end node 113.

Referring to FIG. 8, the controller may obtain times at which signals are received from the end nodes among the backward sampling times. The controller may obtain the times at which the signals are received among the backward sampling times by multiplying the times at which the signals are received by a value of −1.

The controller may receive the signals from the end nodes at one or more sampling times. The controller may receive signals from the first end node at the times $t_0$ [sec], $t_0$+1.9 [sec], and $t_0$+2.7 [sec]. The controller may receive signals from the second end node at the times $t_0$+1.0 [sec], $t_0$+1.6 [sec], and $t_0$+2.5 [sec].

The times (i.e., $-t_0$ [sec], $-t_0$−1.0 [sec], $-t_0$−1.6 [sec], $-t_0$−1.9 [sec], $-t_0$−2.5 [sec], and, $-t_0$−2.7 [sec]) at which signals are received from the end nodes may be obtained among the backward sampling times by multiplying the times (i.e., $t_0$ [sec], $t_0+1.0$ [sec], $t_0+1.6$ [sec], $t_0+1.9$ [sec], $t_0+2.5$ [sec], and, $t_0+2.7$ [sec]) at which the signals are received by a value of −1. The controller may generate a backward graph in which the obtained backward signal reception times are in a horizontal axis and the CAN IDs (i.e., CAN ID A, CAN ID B, and CAN ID C) of the end nodes are in a vertical axis.

In the backward graph, reception times at which the controller receives the signals from the end nodes may be sorted in a reverse order. The controller may obtain a backward graph of a section from $-t_0-2.7$ [sec] to $-t_0$ [sec] of the generated forward graph as a backward reception window.

Referring again to FIG. 7, the controller may extend the backward reception window based on the time axis (S720). The controller may extend the backward reception window by extending the horizontal axis of the backward reception window to both sides. That is, in order to receive signals from all the end nodes (e.g., the end nodes 111 to 113 in FIG. 1), the controller may extend the backward reception window to both sides.

Figure 9:
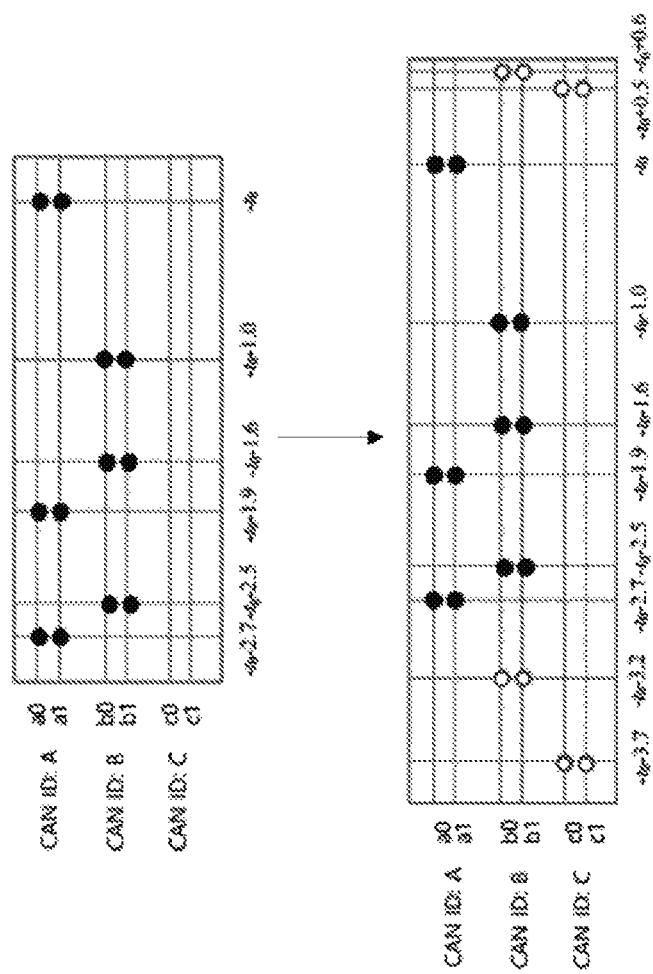
FIG. 9 is a conceptual diagram illustrating a first exemplary embodiment of a method of extending a backward reception window in a vehicle network.

FIG. 9 is a conceptual diagram illustrating a first exemplary embodiment of a method of extending a backward reception window in a vehicle network.

The end nodes and controller of FIG. 9 may be configured identically or similarly to the end nodes 111 to 113 and controller 120 of FIG. 1. In addition, the backward reception window of FIG. 8 may be the same as the backward reception window of FIG. 7.

Referring to FIG. 8, the controller may obtain backward sampling times at which signals are received from the second end node and the third end node before $-t_0-3.7$ [sec], which is a starting time of the backward reception window, based on the backward sampling times. The controller may obtain backward sampling times at which signals are received from the second end node and the third end node after $-t_0$ [sec], which is an ending time of the backward reception window.

The controller may extend the horizontal axis of the forward reception window obtained in the step S710 to both sides. That is, the controller may extend the backward reception window obtained in the step S710 from $-t_0-2.7$ [sec] to the left side (i.e., the direction in which time decreases) and extend the backward reception window from $-t_0$ [sec] to the right side (i.e., the direction in which time increases).

The controller may extend the backward reception window to the left up to the backward sampling time at which the signals are received from the remaining end nodes (e.g., the backward sampling time $-t_0-3.7$ [sec] at which the signal is received from the third end node) before $-t_0$ [sec]. The controller may extend the backward reception window to the right up to the sampling time at which the signals are received from the remaining end nodes (e.g., the backward sampling time $-t_0+0.6$ [sec] at which the signal is received from the second end node) after $-t_0$ [sec].

Referring again to FIG. 7, the controller may generate backward input data based on the backward reception window extended in the step S720 (S730). The controller may generate backward input data by representing the backward reception window extended in the step S730 as one matrix as shown in Equation 7 below.

$$\bar{X}_{ext} = [\bar{x}_{-2} \ \bar{x}_{-1} \ \bar{x}_0 \ ... \ \bar{x}_7] = \begin{bmatrix} n/a & n/a & \bar{x}_{0,0} & n/a & \bar{x}_{0,2} & n/a & n/a & \bar{x}_{0,5} & n/a & n/a \\ n/a & n/a & \bar{x}_{1,0} & n/a & \bar{x}_{1,2} & n/a & n/a & \bar{x}_{1,5} & n/a & n/a \\ n/a & \bar{x}_{2,-1} & n/a & \bar{x}_{2,1} & n/a & \bar{x}_{2,3} & \bar{x}_{2,4} & n/a & n/a & \bar{x}_{2,7} \\ n/a & \bar{x}_{3,-1} & n/a & \bar{x}_{3,1} & n/a & \bar{x}_{3,3} & \bar{x}_{3,4} & n/a & n/a & \bar{x}_{3,7} \\ \bar{x}_{4,-2} & n/a & n/a & n/a & n/a & n/a & n/a & n/a & \bar{x}_{4,6} & n/a \\ \bar{x}_{5,-2} & n/a & n/a & n/a & n/a & n/a & n/a & n/a & \bar{x}_{5,6} & n/a \end{bmatrix}$$

[Equation 7]

$\bar{x}_{0,0}$, $\bar{x}_{0,2}$, $\bar{x}_{0,5}$, $\bar{x}_{1,0}$, $\bar{x}_{1,2}$, and $\bar{x}_{1,5}$ may denote signals received from the first end node at $-t_0-2.7$ [sec], $-t_0-1.9$ [sec], and $-t_0$ [sec] among the backward sampling times. $\bar{x}_{2,-1}$, $\bar{x}_{2,1}$, $\bar{x}_{2,3}$, $\bar{x}_{2,4}$, $\bar{x}_{2,7}$, $\bar{x}_{3,-1}$, $\bar{x}_{3,1}$, $\bar{x}_{3,3}$, $\bar{x}_{3,4}$, and $\bar{x}_{3,7}$ may denote signals received from the second end node at $-t_0-3.2$ [sec], $-t_0-2.5$ [sec], $-t_0-1.6$ [sec], $-t_0-1.0$ [sec], and $-t_0+0.6$ [sec] among the backward sampling times. $\bar{x}_{4,-2}$, $\bar{x}_{4,6}$, $\bar{x}_{5,-2}$, and $\bar{x}_{5,6}$ may denote signals received from the second end node at $-t_0-3.7$ [sec] and $-t_0+0.5$ [sec] among the backward sampling times.

The controller may generate backward mask data and backward time intervals based on the backward input data generated in the step S730 (S740).

The controller may generate backward mask data, which is a matrix having a value of 1 when a signal is received at a corresponding backward sampling time and a value of 0 when a signal is not received at the corresponding backward sampling time. Here, the backward sampling time may be a time at which a signal is received from at least one of the end nodes 111 to 113. For example, the controller may generate backward mask data such as Equation 8 below based on the backward input data generated according to Equation 7.

$$\bar{M}_{ext} = [\bar{m}_{-2} \ \bar{m}_{-1} \ \bar{m}_0 \ ... \ \bar{m}_7] = \begin{bmatrix} 0 & 0 & 1 & 0 & 1 & 0 & 0 & 1 & 0 & 0 \\ 0 & 0 & 1 & 0 & 1 & 0 & 0 & 1 & 0 & 0 \\ 0 & 1 & 0 & 1 & 0 & 1 & 1 & 0 & 0 & 1 \\ 0 & 1 & 0 & 1 & 0 & 1 & 1 & 0 & 0 & 1 \\ 1 & 0 & 0 & 0 & 0 & 0 & 0 & 0 & 1 & 0 \\ 1 & 0 & 0 & 0 & 0 & 0 & 0 & 0 & 1 & 0 \end{bmatrix}$$

[Equation 8]

The controller may generate a backward sampling matrix indicating differences between the backward sampling times of the end nodes. The backward sampling matrix may be a matrix indicating time differences between the earliest backward sampling time and the remaining backward sampling times in the extended backward reception window. For example, a backward sampling matrix such as Equation 9 below may be generated based on the extended backward reception window of FIG. 8.

$$\bar{s}_{ext} = [\bar{s}_{-2} \ \bar{s}_{-1} \ \bar{s}_0 \ ... \ \bar{s}_9]$$
$$= [0 \ 0.5 \ 1.0 \ 1.2 \ 1.8 \ 2.1 \ 2.7 \ 3.7 \ 4.2 \ 4.3]$$

[Equation 9]

In Equation 9, each component of the backward matrix may represent a difference between the earliest time $-t_0-3.7$ [sec] among the backward sampling times of the end nodes and each of the remaining sampling times. The controller may generate backward time interval data based on the backward sampling matrix and the backward mask data. The controller may generate the backward time interval data in a matrix form based on Equation 10 below.

$$\tilde{\delta}_{k,t} = \begin{cases} \bar{s}_t - \bar{s}_{t-1} + \tilde{\delta}_{k,t-1}, & \text{for } t > \min(t), \bar{m}_{k,t} = 0 \\ \bar{s}_t - \bar{s}_{t-1}, & \text{for } t > \min(t), \bar{m}_{k,t} = 1 \\ 0, & t = \min(t) \end{cases} \quad \text{[Equation 10]}$$

$\bar{s}_t$ may be a t-th component of the backward sampling matrix, $\tilde{\delta}_{k,t-1}$ may be a component of a k-th row and a (t−1)-th column of the backward time interval data, min (t) may be the earliest time among the backward sampling times of the extended backward reception window, and $\bar{m}_{k,t}$ may be a component of a k-th row and a t-th column of the backward mask data.

For example, the backward time interval data may be generated as shown in Equation 11 below based on the backward mask data generated by Equation 8 and the backward sampling matrix generated by Equation 9.

$$\tilde{\Delta}_{ext} = \begin{bmatrix} \tilde{\delta}_{-2} & \tilde{\delta}_{-1} & \tilde{\delta}_0 & \dots & \tilde{\delta}_7 \end{bmatrix} \quad \text{[Equation 11]}$$

$$= \begin{bmatrix} 0 & 0.5 & 1.0 & 0.2 & 0.6 & 0.3 & 0.9 & 1.9 & 0.5 & 0.6 \\ 0 & 0.5 & 1.0 & 0.2 & 0.6 & 0.3 & 0.9 & 1.9 & 0.5 & 0.6 \\ 0 & 0.5 & 0.5 & 0.7 & 0.6 & 0.9 & 0.6 & 1.0 & 1.5 & 1.6 \\ 0 & 0.5 & 0.5 & 0.7 & 0.6 & 0.9 & 0.6 & 1.0 & 1.5 & 1.6 \\ 0 & 0.5 & 1.0 & 1.2 & 1.8 & 2.1 & 2.7 & 3.7 & 4.2 & 0.1 \\ 0 & 0.5 & 1.0 & 1.2 & 1.8 & 2.1 & 2.7 & 3.7 & 4.2 & 0.1 \end{bmatrix}$$

Referring again to FIG. 3, the controller may detect an abnormal signal among the received signals based on the result of the forward preprocessing performed in the step S310 and the result of the backward preprocessing performed in the step S320 (S330).

The controller may input the forward input data, the forward mask data, and the forward time interval data, which are the result of forward preprocessing, and the backward input data, the backward mask data, and the backward time interval data, which are the result of backward preprocessing, to a gated recurrent unit-decay (GRU-D) neural network. The GRU-D neural network may determine whether the received signals are abnormal based on the input data.

Figure 10:
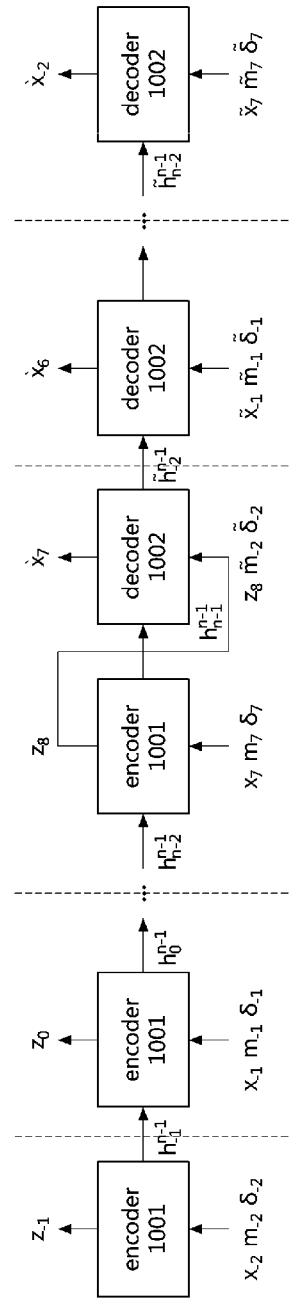
FIG. 10 is a block diagram illustrating a first exemplary embodiment of a GRU-D neural network in a vehicle network.

FIG. 10 is a block diagram illustrating a first exemplary embodiment of a GRU-D neural network in a vehicle network. Referring to FIG. 10, the GRU-D neural network may include a GRU-D encoder 1001 and a GRU-D decoder 1002. Although a plurality of GRU-D encoders and a plurality of GRU-D decoders are shown in FIG. 10, this is for explaining iterated operations of the GRU-D encoder 1001 and the GRU-D decoder 1002, and the same GRU-D encoder 1001 and the same GRU-D decoder 1002 are iteratively used.

Figure 11:
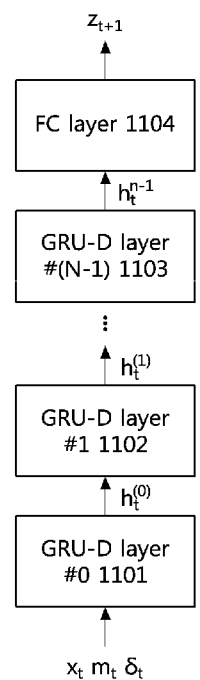
FIG. 11 is a block diagram illustrating a first exemplary embodiment of a GRU-D encoder in a vehicle network.

FIG. 11 is a block diagram illustrating a first exemplary embodiment of a GRU-D encoder in a vehicle network.

Referring to FIG. 11, the GRU-D encoder may include a plurality of GRU-D layers 1101 to 1103 and a fully-connected (FC) layer 1104.

Referring again to FIG. 11, a GRU-D layer #0 1101, which is the lowest layer among the plurality of GRU-D layers, may receive one column $x_t$ of the forward input data, one column $m_t$ of the forward mask data, and one column $\delta_t$ of the forward interval data as input signals. $x_t$, $m_t$, and $\delta_t$ may be components of the t-th columns of the respective matrixes.

The GRU-D layer #0 1101 may generate a zero-th hidden matrix $h_t^0$ based on $x_t$, $m_t$, and $\delta_t$. The GRU-D layer #0 1101 may transmit $h_t^0$ to the GRU-D layer #1 1102. The GRU-D layer #1 1102 may receive $h_t^0$ from the GRU-D layer #0 1101. The GRU-D layer #1 1102 may generate a first layer hidden matrix $g_t^1$ based on $h_t^0$.

The GRU-D layer #(N−1) 1103 may receive a (N−2)-th layer hidden matrix $h_t^{n-2}$ from the GRU-D layer #(N−2). The GRU-D layer #(N−1) 1103 may generate a first hidden matrix $h_t^{n-1}$ based on $h_t^{n-2}$.

Also, the GRU-D layer #(N−1) 1103 may transmit the generated first hidden matrix $h_t^{n-1}$ to the FC layer 1104. The FC layer 1104 may receive the first hidden matrix $h_t^{n-1}$ from the GRU-D layer #(N−1) 1103. The FC layer 1104 may generate encoder data $z_{t+1}$ based on $h_t^{n-1}$.

Meanwhile, the GRU-D decoder of FIG. 10 may be configured as follows.

Figure 12:
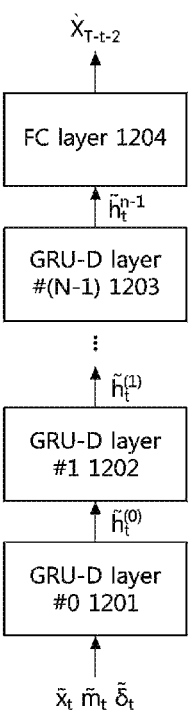
FIG. 12 is a conceptual diagram illustrating a first exemplary embodiment of a GRU-D decoder in a vehicle network.

Referring to FIG. 12, the GRU-D decoder may include a plurality of GRU-D layers 1201 to 1203 and an FC layer 1204.

The GRU-D layer #0 1201, which is the lowest layer among the plurality of GRU-D layers, may receive one column $\bar{x}_t$ of the backward input data, one column $\bar{m}_t$ of the backward mask data, and one column $\bar{\delta}_t$ of the forward interval data as an input signal.

A GRU-D layer #0 1201, which is the lowest layer among the plurality of GRU-D layers, may receive one column $\bar{x}_t$ of the backward input data, one column $\bar{m}_t$ of the mask data, and one column $\bar{\delta}_t$ of the backward interval data as input signals.

The GRU-D layer #0 1201 may generate a zero-th layer backward hidden matrix $\bar{h}_t^{(0)}$ based on the received $\bar{x}_t$, $\bar{m}_t$, and $\bar{\delta}_t$. The GRU-D layer #0 1201 may transmit the generated $\bar{h}_t^{(0)}$ to the GRU-D layer #1 1202. The GRU-D layer #1 1202 may receive the zero-th hidden layer matrix $\bar{h}_t^{(0)}$ from the GRU-D layer #0 1201. The GRU-D layer #1 1202 may generate a first layer backward hidden matrix $\bar{h}_t^{(1)}$ based on $\bar{h}_t^{(0)}$.

The GRU-D layer #(N−1) 1203 may receive an (n−2)-th backward hidden matrix $\bar{h}_t^{n-2}$ from the GRU-D layer #(N−2). The GRU-D layer #(N−1) 1203 may generate a first backward hidden layer matrix $\bar{h}_t^{n-1}$ based on $\bar{h}_t^{n-2}$.

Also, the GRU-D layer #(N−1) 1203 may transmit the generated first backward hidden matrix $\bar{h}_t^{n-1}$ to the FC layer 1204. The FC layer 1204 may receive the first backward hidden matrix $\bar{h}_t^{n-1}$ from the GRU-D layer #(N−1) 1203. The FC layer 1204 may generate estimated data $\hat{x}_{T-t-2}$ based on $\bar{h}_t^{n-1}$.

Meanwhile, each of the GRU-D layers 1101 to 1101 and 1201 to 1203 may be configured as follows.

Figure 13:
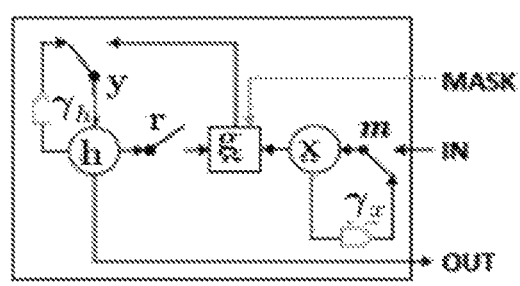
FIG. 13 is a conceptual diagram illustrating a first exemplary embodiment of a GRU-D layer.

FIG. 13 is a conceptual diagram illustrating a first exemplary embodiment of a GRU-D layer.

FIG. 13 describes a layer of the GRU-D encoder, but this may also be applied to a layer of the GRU-D decoder.

Referring to FIG. 13, the GRU-D layer may include a reset gate r, an update gate y and a mask gate g. The reset gate r may determine how to merge a new input with a previous memory. The update gate z may determine how much to reflect the previous memory. The reset gate r may obtain a reset parameter based on Equation 12 below.

$$r_t = \sigma(W_r \check{x}_t + U_r \check{h}_{(t-1)} + V_r m_t + b_r) \quad \text{[Equation 12]}$$

In Equation 12, $r_t$ may be a reset parameter, $\sigma$ may mean a sigmoid function, $W^r$ may mean a weight for $\check{x}_{k,t}$, $U^r$ may mean a weight for $\check{h}_{(t-1)}$, $V_r$ may mean a weight for $m_t$, and $b_r$ may mean a bias vector. $\check{x}_{k,t}$ may be calculated based on Equation 13 below.

$$\check{x}_{k,t} = m_{k,t} x_{k,t} + (1 - m_{k,t})(\gamma_{k,t} x_{k,t_k} + (1 - \gamma_{k,t}) \bar{x}_k) \quad \text{[Equation 13]}$$

In Equation 13, $\bar{x}_k$ may be a past average value of k-th input data, and $\gamma_{k,t}$ may be a k-th value of $\gamma_t$. $\gamma_t$ may be calculated based on Equation 14 below.

$$\gamma_t = \exp(-\max(0, W_\gamma \delta_t + b_\gamma)) \quad \text{[Equation 14]}$$

In Equation 14, $W_\gamma$ may be a weight for $\gamma_t$ and $b_\gamma$ may mean a bias vector.

Meanwhile, the update gate y may obtain an update parameter y using Equation 15 below.

$$y_t = \sigma(W_y \check{x}_t + U_y \check{h}_{(t-1)} + V_y m_t + b_y)$$ [Equation 15]

In Equation 15, $W_y$ may be a weight for $\check{x}_t$, $U_y$ may be a weight for $\check{h}_{(t-1)}$, $V_y$ may be a weight for $m_t$, and $b_y$ may mean a bias vector.

$$g_t = \tanh(W\check{x}_t + U(r_t \odot \check{h}_{(t-1)}) + V m_t + b)$$ [Equation 16]

Meanwhile, the GRU-D layer may calculate a new hidden vector $h_t$ according to Equation 17 below.

$$h_t = (1-y_t) \odot \check{h}_{(t-1)} + y_t \odot g_t$$ [Equation 17]

Referring again to FIG. 10, the GRU-D encoder 1001 may receive the forward input data, the forward mask data, and the forward time interval data.

The GRU-D encoder 1001 may generate encoder data $z_{-1}$ and a first hidden matrix $h_{-2}{}^{n-1}$ based on a first column component (e.g., the $x_{-2}$ column component of Equation 1 in FIG. 4) of the forward input data, a first column component (e.g., the $m_{-2}$ column component of Equation 2 in FIG. 4) of the forward mask data, and a first column component (e.g., the $\delta_{-2}$ column component of Equation 5 in FIG. 4) of the forward time interval. Here, the FC layer of the GRU-D encoder 1001 (e.g., the FC layer 1104 of FIG. 11) may generate $z_{-1}$, and the last GRU-D layer of the GRU-D encoder 1001 (e.g., the last layer 1103 of FIG. 11) may generate the first hidden matrix $h_{-2}{}^{n-1}$.

The GRU-D decoder 1002 may receive the backward input data, the backward mask data, and the backward interval data. Also, the GRU-D decoder 1002 may receive an N-th hidden matrix $h_{n-1}{}^{n-1}$ from the GRU-D encoder 1001.

The GRU-D decoder 1002 may generate estimated data of the forward input data of the GRU-D encoder 1001 based on a first column component (e.g., the $\bar{x}_{-2}$ column component of Equation 7 in FIG. 7) of the backward input data, a first column component (e.g., the $\bar{m}_{-2}$ column component of Equation 8 in FIG. 7) of the backward mask data, and a first column component (e.g., the $\bar{\delta}_{-2}$ column component of Equation 11 in FIG. 7) of the backward time interval.

When the input data of the GRU-D encoder 1001 is $x_7$, the GRU-D decoder 1002 may generate $\hat{x}_7$ as the estimated data. Also, the GRU-D decoder 1002 may generate a first backward hidden matrix $\bar{h}_{-2}{}^{n-1}$ based on the backward input data, the backward mask data, the backward time interval, and the N-th hidden matrix.

The GRU-D decoder 1002 may generate estimated data based on a second column component (e.g., a $\bar{x}_{-1}$ column component of Equation 7 in FIG. 7) of the backward input data, a second column component (e.g., a $\bar{m}_{-1}$ column component of Equation 8 in FIG. 7) of the backward mask data, a second column component (e.g., a $\bar{\delta}_{-1}$ column component of Equation 11 in FIG. 7) of the backward time interval, and the first backward hidden matrix $\bar{h}_{-2}{}^{n-1}$. When the forward input data of the GRU-D encoder 1001 is $x_6$, the decoder may generate $\hat{x}_6$ as the estimated data.

The GRU-D decoder 1002 may generate a second backward hidden matrix $\bar{h}_{-1}{}^{n-2}$ based on the backward input data, the backward mask data, the backward time interval, and the first backward hidden matrix. In addition, the GRU-D decoder 1002 may generate estimated data based on a last column component (e.g., the $\bar{x}_7$ column component of Equation 7 in FIG. 4) of the backward input data, a last column component (e.g., the $\bar{m}_7$ column component of Equation 8 in FIG. 4) of the backward mask data, a last column component (e.g., the $\bar{\delta}_7$ column component of Equation 11 in FIG. 4) of the backward time interval, and the (N−1)-th backward hidden matrix $\bar{h}_{n-2}{}^{n-2}$. When the input data of the GRU-D encoder 1001 is $x_{-2}$, the GRU-D decoder 1002 may generate $\hat{x}_{-2}$ as the estimated data.

The GRU-D neural network may detect an abnormal signal among received signals by comparing the forward input data and the estimated data output from the GRU-D decoder 1002. Meanwhile, the controller may calculate a mean squared error (MSE) indicating a difference between the input data and the estimated data based on Equation 18 below.

$$MSE = \frac{1}{(T-1)} \sum_{t=0}^{T-2} \frac{\|m_t \odot (x_t - \hat{x}_t)\|^2}{\|m_t\|^2}$$ [Equation 18]

Here, $m_t$ may be the forward mask data, $x_t$ may be the forward input data, and $\hat{x}_t$ may be the estimated data calculated by the decoder 1002. Also, T may indicate the number of iterations of the encoder and the decoder. Meanwhile, $x_t$ and $\hat{x}_t$ may be the same column component.

The controller may calculate the size of the MSE based on the sizes of $x_t$ and $\hat{x}_t$. The size of the MSE may have a large value when the size difference between $x_t$ and $\hat{x}_t$ is large, and may have a small value when the size difference is small.

The controller may detect an abnormal signal based on the size of the MSE. When the MSE is greater than or equal to a preset value, the controller may determine that the input signal is an abnormal signal. When the MSE is less than the preset value, the controller may determine that the input signal is a normal signal. The controller may minimize the MSE by adjusting the parameters of the GRD-D layers (e.g., the GRU-D layers of FIG. 13) according to Equation 18. The controller may adjust the parameters using algorithms such as the RMSProp and ADAM algorithms. The RMSProp and ADAM algorithms are obvious to those skilled in the art, and thus description thereof is omitted in the present disclosure.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the exemplary embodiments of the present disclosure and their advantages have been described in detail, it should be understood that various changes, substitutions and alterations may be made herein without departing from the scope of the present disclosure.

What is claimed is:

1. An operation method of a controller area network (CAN) controller in a communication network, the operation method comprising:

receiving CAN signals from a plurality of CAN communication nodes;

generating forward input data by performing forward preprocessing on the received CAN signals based on forward sampling times;

generating forward mask data for the forward input data and forward time interval data based on differences between the forward sampling times;

generating backward input data by performing backward preprocessing on the CAN signals based on backward sampling times;

generating backward mask data for the backward input data and backward time interval data based on differences between the backward sampling times; and detecting an abnormal signal among the CAN signals by inputting the forward input data, forward mask data, forward time interval data, backward input data, backward mask data, and backward time interval data into a gated recurrent unit-decay (GRU-D) neural network including a GRU-D encoder including a plurality of GRU-D layers and a GRU-D decoder having a symmetrical structure with the GRU-D encoder;

wherein the generating of the forward input data comprises:

obtaining a forward reception window based on the forward sampling times;

extending the forward reception window in a forward direction based on a time axis to a sampling time at which a received CAN signal exists;

extending the forward reception window in a backward direction based on the time axis to a sampling time at which a received CAN signal exists; and generating the forward input data, which is a matrix indicating types of the CAN signals, based on the extended forward reception window;

wherein the forward mask data is a matrix having a value of 1 when there is data at a corresponding sampling time and having a value of 0 when there is no data at the corresponding sampling time;

wherein the generating of the backward input data comprises:

obtaining a backward reception window based on the backward sampling times;

extending the backward reception window in a backward direction based on a time axis to a sampling time at which a received CAN signal exists;

extending the backward reception window in a forward direction based on the time axis to a sampling time at which a received CAN signal exists; and generating the backward input data, which is a matrix indicating types of the CAN signals, based on the extended backward reception window; and wherein the detecting of the abnormal signal comprises:

outputting, by the GRU-D encoder, a second hidden matrix and encoder data based on the backward input data, the backward mask data, and the forward time interval data;

outputting, by the GRU-D decoder, estimated data based on the second hidden matrix, the encoder data, the backward mask data, and the backward time interval data; and detecting the abnormal signal among the CAN signals by comparing the forward input data and the estimated data.

2. A controller area network (CAN) controller in a communication network, the CAN controller comprising a processor and a memory storing at least one instruction executable by the processor, wherein when executed by the processor, the at least one instruction causes the processor to:

receive CAN signals from a plurality of CAN communication nodes;

generate forward input data by performing forward preprocessing on the received CAN signals based on forward sampling times;

generate forward mask data for the forward input data and forward time interval data based on differences between the forward sampling times;

generate backward input data by performing backward preprocessing on the CAN signals based on backward sampling times;

generate backward mask data for the backward input data and backward time interval data based on differences between the backward sampling times; and detect an abnormal signal among the CAN signals by inputting the forward input data, forward mask data, forward time interval data, backward input data, backward mask data, and backward time interval data into a gated recurrent unit-decay (GRU-D) neural network including a GRU-D encoder including a plurality of GRU-D layers and a GRU-D decoder having a symmetrical structure with the GRU-D encoder;

wherein in the generating of the forward input data, the at least one instruction further causes the processor to:

obtain a forward reception window based on the forward sampling times;

extend the forward reception window in a forward direction based on a time axis to a sampling time at which a received CAN signal exists;

extend the forward reception window in a backward direction based on the time axis to a sampling time at which a received CAN signal exists; and generate the forward input data, which is a matrix indicating types of the CAN signals, based on the extended forward reception window;

wherein the forward mask data is a matrix having a value of 1 when there is data at a corresponding sampling time and having a value of 0 when there is no data at the corresponding sampling time;

wherein in the generating of the backward input data, the at least one instruction further causes the processor to:

obtain a backward reception window based on the backward sampling times;

extend the backward reception window in a backward direction based on a time axis to a sampling time at which a received CAN signal exists;

extend the backward reception window in a forward direction based on the time axis to a sampling time at which a received CAN signal exists; and generate the backward input data, which is a matrix indicating types of the CAN signals, based on the extended backward reception window; and wherein in the detecting of the abnormal signal, the at least one instruction further causes the processor to:

output, by the GRU-D encoder, a second hidden matrix and encoder data based on the backward input data, the backward mask data, and the forward time interval data;

output, by the GRU-D decoder, estimated data based on the second hidden matrix, the encoder data, the backward mask data, and the backward time interval data; and detect the abnormal signal among the CAN signals by comparing the forward input data and the estimated data.

* * * * *